United States Patent
Zhou et al.

(10) Patent No.: US 8,414,683 B2
(45) Date of Patent: Apr. 9, 2013

(54) INTEGRATED PROCESS FOR FLOATING LIQUEFIED NATURAL GAS PRETREATMENT

(75) Inventors: Lubo Zhou, Inverness, IL (US); Xiaoming Wen, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 69 days.

(21) Appl. No.: 13/091,782

(22) Filed: Apr. 21, 2011

(65) Prior Publication Data

US 2011/0290110 A1  Dec. 1, 2011

Related U.S. Application Data

(60) Provisional application No. 61/349,453, filed on May 28, 2010.

(51) Int. Cl.
*B01D 53/22* (2006.01)

(52) U.S. Cl. ............................. 95/45; 95/49; 95/51; 96/4

(58) Field of Classification Search .............. 95/45, 49, 95/51; 96/4, 7–14
See application file for complete search history.

(56) References Cited

U.S. PATENT DOCUMENTS

| | | | | |
|---|---|---|---|---|
| 4,466,946 A | * | 8/1984 | Goddin et al. | 423/228 |
| 4,589,896 A | * | 5/1986 | Chen et al. | 92/28 |
| 5,025,860 A | | 6/1991 | Mandrin | |
| 5,233,837 A | * | 8/1993 | Callahan | 62/621 |
| 5,326,385 A | | 7/1994 | Rajani et al. | |
| 5,558,698 A | | 9/1996 | Baker et al. | |
| 5,647,227 A | * | 7/1997 | Lokhandwala | 62/624 |
| 6,128,919 A | * | 10/2000 | Daus et al. | 62/624 |
| 6,197,269 B1 | * | 3/2001 | Jansen et al. | 423/243.01 |
| 6,648,944 B1 | * | 11/2003 | Baker et al. | 95/39 |
| 7,048,778 B2 | * | 5/2006 | Gobina | 95/51 |
| 7,168,265 B2 | | 1/2007 | Briscoe et al. | |
| 7,314,503 B2 | * | 1/2008 | Landrum et al. | 95/50 |
| 7,396,388 B2 | | 7/2008 | Mitariten | |
| 7,442,231 B2 | | 10/2008 | Landrum | |
| 7,442,233 B2 | | 10/2008 | Mitariten | |
| 8,192,524 B2 | * | 6/2012 | Chinn et al. | 95/51 |
| 2005/0265911 A1 | | 12/2005 | Yuan | |
| 2007/0006730 A1 | | 1/2007 | Hsu et al. | |
| 2009/0288556 A1 | * | 11/2009 | Gearhart et al. | 95/51 |
| 2010/0186586 A1 | * | 7/2010 | Chinn et al. | 95/45 |
| 2011/0239700 A1 | * | 10/2011 | Hasse et al. | 62/617 |
| 2011/0268618 A1 | * | 11/2011 | Finkenrath | 422/169 |
| 2011/0290111 A1 | * | 12/2011 | Dunne et al. | 95/51 |
| 2012/0111192 A1 | * | 5/2012 | Nazarko et al. | 95/51 |

FOREIGN PATENT DOCUMENTS

| WO | 2009020473 A1 | | 2/2009 |
|---|---|---|---|
| WO | WO 2009016139 A1 | * | 2/2009 |
| WO | WO 2009087155 A1 | * | 7/2009 |
| WO | WO 2009087156 A1 | * | 7/2009 |
| WO | WO 2009098173 A1 | * | 8/2009 |
| WO | WO 2009124372 A2 | * | 10/2009 |

\* cited by examiner

*Primary Examiner* — Jason M Greene
*Assistant Examiner* — Anthony Shumate
(74) *Attorney, Agent, or Firm* — Mark Goldberg

(57) ABSTRACT

The present invention provides a membrane/amine column system and process for removing acid gases from natural gas on a floating liquefied natural gas vessel. Several process configurations are provided to deal with a reduction in the effectiveness of the amine column by increasing the amount of acid gases being removed by the membrane system prior to the natural gas being sent to the amine column.

10 Claims, 4 Drawing Sheets

INTEGRATED PROCESS FOR FLOATING LIQUEFIED NATURAL GAS PRETREATMENT

CROSS-REFERENCE TO RELATED APPLICATION

This application claims priority from Provisional Application No. 61/349,453 filed May 28, 2010, the contents of which are hereby incorporated by reference.

BACKGROUND OF THE INVENTION

The present invention relates to a process for processing natural gas. More particularly, this invention relates to an integrated process for treating natural gas that is to be converted to liquefied natural gas (LNG) on a ship based system.

A new type of vessel is being developed that may revolutionize offshore production of natural gas. The gas industry is currently planning to build a fleet of ships or barges that can be sailed or towed to the site of offshore gas deposits, extract the gas, pretreatment the natural gas to remove impurities, then freeze it to become LNG and then offload the LNG to tankers for shipping to market. It is hoped that these floating liquefied natural gas (FLNG) ships will be cheaper to use than building onshore pretreatment and liquefaction facilities, speed up the time to bring fields on stream and make it economical to exploit small and remote offshore gas fields. It has been estimated that over ⅙ of global gas reserves are in such fields. There are also security advantages to produce gas offshore in some parts of the world instead of in onshore facilities. In addition, the use of FLNG vessels avoids impacting onshore wildlife habitats and the need to move communities due to the onshore space needed for land based facilities.

In LNG service, the natural gas has to be cleaned before it is sent to a liquefaction unit. Generally, the treated gas $CO_2$ concentration has to be below 50 ppm to avoid freezing of $CO_2$ in the liquefaction process. Water is also removed to avoid hydrate formation. The use of an amine solvent is a well known process and is an accepted technology for land based LNG pretreatment. For offshore FLNG service, however, there are at least two problems associated with use of a solvent process. First, footprint and weight are two important parameters for the ship and platform builder. When an acid gas such as $CO_2$ is present at an increased concentration in a natural gas feed, the amine absorption column diameter and the amine solvent circulation rate that is needed significantly increases, which leads to large footprint and heavy weight. Second, motion at sea often generates flow maldistribution inside amine absorber and regenerator. This flow maldistribution results in low separation efficiency of a solvent process. Hence, due to the motion, the natural gas stream after the amine treatment may not be able to meet the stringent specifications of acid gases such as $CO_2$ required by liquefaction.

SUMMARY OF THE INVENTION

The present invention, which is intended to be applied on a movable platform such as on a ship or barge, involves a process for removal of acid gases from a raw natural gas stream comprising first sending the raw natural gas stream through a membrane unit containing a membrane for selective separation of acid gases from natural gas and thereby forming a partially purified natural gas stream having an acid gas content lower than the raw natural gas stream. The resulting partially purified natural gas stream is sent to an amine column to be placed in contact with an aqueous amine absorbent contained within the amine column to further remove acid gases and to form a natural gas product effluent having acid gas content less than the partially purified natural gas stream. The platform containing the equipment used to purify natural gas is subject to movement caused by ocean waves and winds. This movement can cause maldistribution of liquid within vessels and can impact the effectiveness of the amine column in removing acid gases such as carbon dioxide and hydrogen sulfide. The present invention deals with this problem by integrating the membrane system and the amine system by changing the membrane operation conditions or process configurations, hence, changing the feed acid gas concentration to the amine absorber, the integrated system can mitigate the effect of maldistribution and deliver the treated gas meeting the feed specifications for LNG liquefaction. The membrane unit and amine column can be located on a ship, a barge or another vessel capable of passage on an ocean.

DETAILED DESCRIPTION OF THE INVENTION

Figure 1:
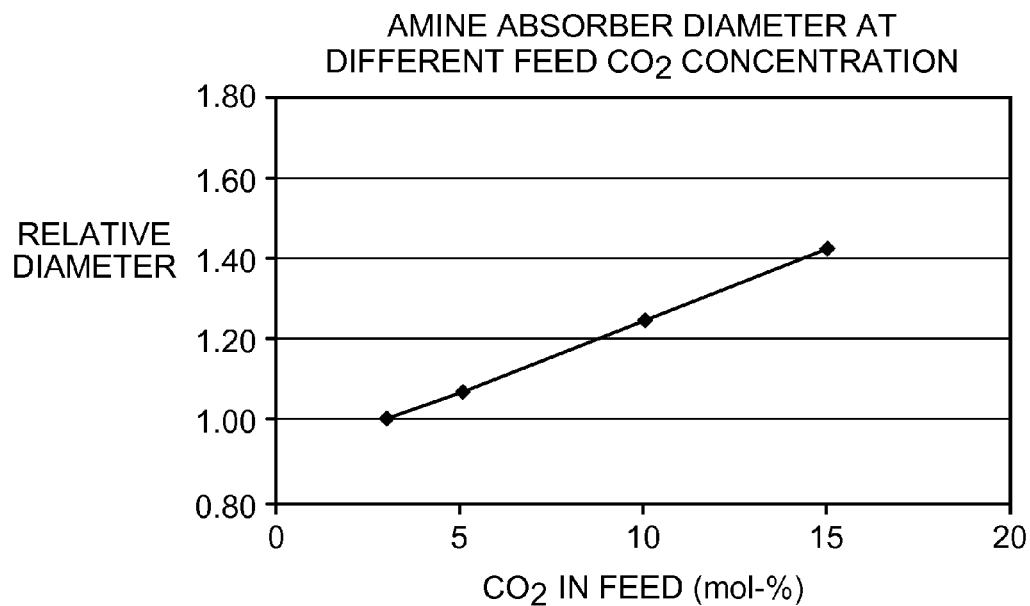
FIG. 1 is a graph of amine absorber diameters at different concentrations of carbon dioxide in the natural gas feed.
Figure 2:
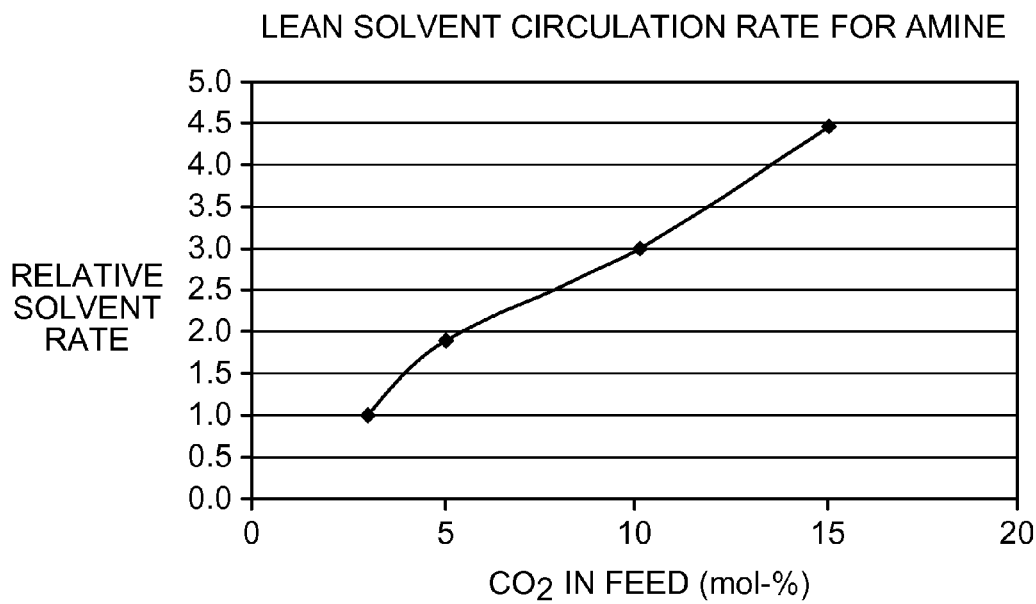
FIG. 2 is a graph of the lean solvent circulation rate for amine that is required for different concentrations of carbon dioxide in the natural gas feed.

FIG. 1 shows the relative column diameter needed to treat natural gas streams having $CO_2$ concentrations ranging from about 4 to 15 mol-%. FIG. 2 shows the lean solvent circulation rate that would be needed to treat natural gas having these concentrations of $CO_2$ and would still meet specification requirements of less than 50 parts per million $CO_2$ in the natural gas that is being treated. In an offshore service, this will significantly increase the footprint and weight of the system. There are practical limitations on the maximum size of an amine system that can be built and placed topsides of a ship as part of the pretreatment system. A mobile pretreatment system would need to be designed to treat natural gas feeds streams having differing levels of contamination. The FLNG ship or platform would need to continue to work at various sea conditions of wind and waves. Due to the motion of the ship or other platform, maldistribution of a liquid flow inside the columns and inside pressure vessels will occur. This maldistribution can result in a deviation of the process performance. The maldistribution of liquid in a column can be defined using the following equation:

$$\lambda = \frac{L_{max} - L_{min}}{L_{max} + L_{min}}$$

where λ is the maldistribution factor and L is the local liquid loading inside the column.

Figure 3:
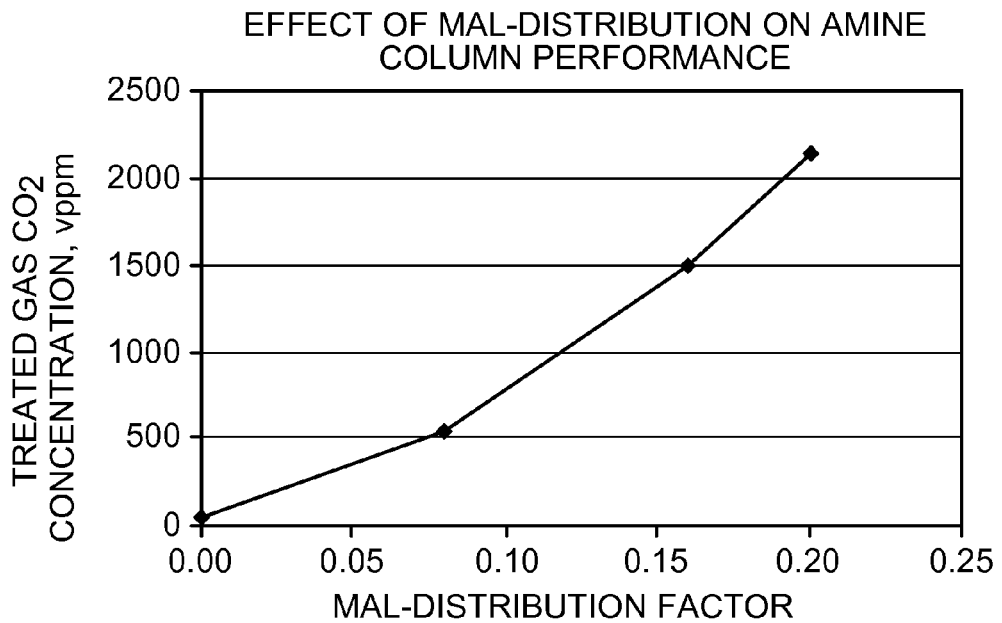
FIG. 3 is a graph of the effect of maldistribution on amine column performance based upon the carbon dioxide concentration in a treated natural gas stream.

The larger that λ is, the greater that the maldistribution will be. Using the maldistribution factor, it is possible to simulate the amine absorption column performance under motion conditions. FIG. 3 shows the treated gas $CO_2$ concentration as a function of maldistribution factor λ. At a different λ, the column can be operated at identical operating conditions such as temperature, pressure, and lean solvent circulation flow rate. However, the concentration of $CO_2$ in the treated gas increases from less than 50 ppm (λ=0) to more than 2000 ppm (λ=0.2). For a commercial FLNG unit, if the gas to the liquefaction system has a $CO_2$ concentration at 2000 ppm, the liquefaction will not be able to operate normally due to hydrate generation.

A solution that has been found to this problem is to integrate the membrane system with the amine system to clean up the gas. In this process, the membrane is used for bulk removal of acid gas from the natural gas, and the amine system is used to finish the clean up of the acid gas to a parts per million level (generally less than 50 ppm) in order to meet the specifications for a liquefaction section of a LNG facility. Since the membrane can remove sufficient acid gas to bring the concentration from a high level to a significantly lower concentration, the amine clean-up system can be much smaller and lighter. Polymeric membrane systems, such as UOP's Separex™ membrane system, have a proven track record of providing bulk acid gas removal in demanding offshore applications. The technology is well suited to treating feed gas streams with high levels of acid gas and reducing the acid gas level to moderate levels that can more easily be treated in an amine unit. Since the membrane technology scales are based on partial pressure of the acid gas in the feed, a membrane system will be inherently smaller, lighter weight, more compact and more robust than an amine unit treating a similarly high acid gas feed stream.

Figure 4:
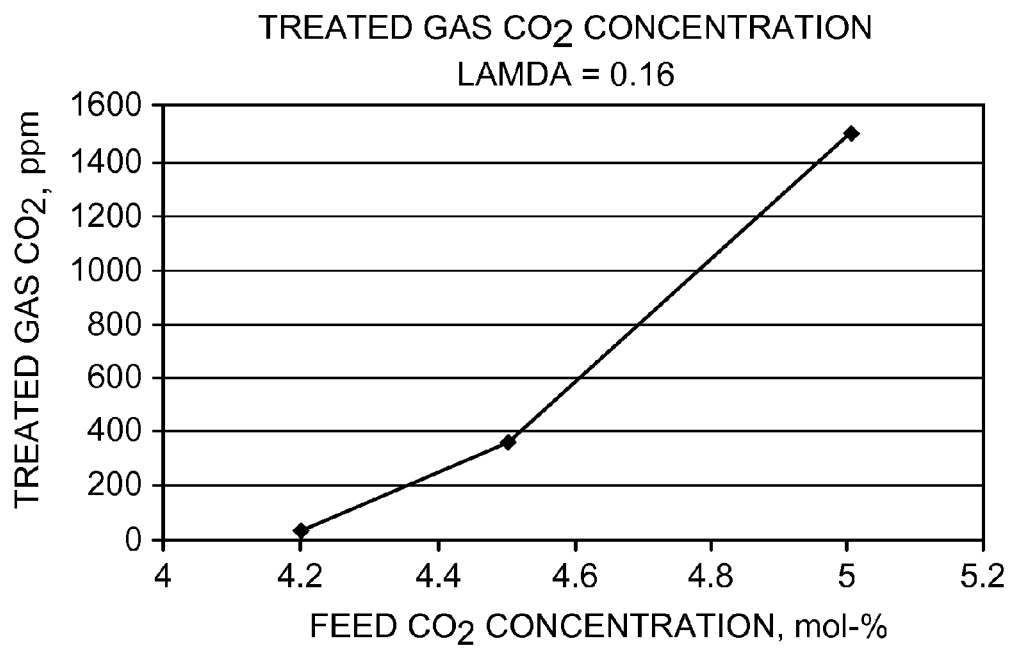
FIG. 4 is a graph of the carbon dioxide concentration in a treated feed against the carbon dioxide concentration in the untreated feed at a lambda ($\lambda$) value of 0.16.

Not only can the membrane reduce the footprint, weight, and cost, it also can be used as a tool to mitigate the effect of maldistribution on amine column performance so that the integrated process is much more robust. In FIG. 4, assuming the amine absorption column with a maldistribution factor λ=0.16, when the feed $CO_2$ concentration is 5%, the treated gas $CO_2$ concentration is above 1500 ppm. However, if we reduce the feed $CO_2$ concentration to 4.2%, the treated gas will have a $CO_2$ concentration below 50 ppm that meets the LNG liquefaction feed specification although the column is running at the same operating conditions and the maldistribution factor does not change. This demonstrates that by changing the membrane operation conditions or process configurations, hence, changing the feed acid gas concentration to the amine absorber, the integrated system can mitigate the effect of maldistribution and deliver the treated gas meeting the feed specifications for LNG liquefaction section.

Figure 5:
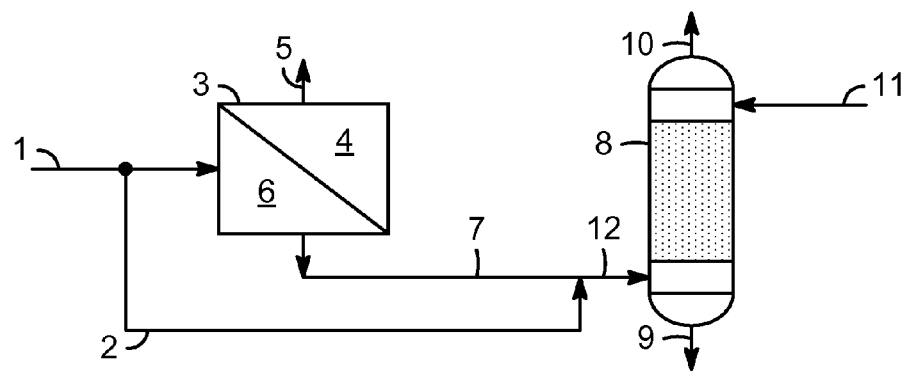
FIG. 5 is a membrane/amine column system for treating a natural gas stream in which there is a bypass stream to adjust the amount of natural gas that is being treated by the membrane part of the system.

The simplest process configuration is shown in FIG. 5 where a bypass stream is designed for the membrane system. When motion becomes stronger and severer and maldistribution happens in the amine process, the bypass stream flow rate will be reduced to obtain the low $CO_2$ concentration to the feed of amine process. More specifically, FIG. 5 is seen a natural gas stream 1 that is sent to a membrane unit 3. A portion 2 of the natural gas stream is shown bypassing the membrane unit 3. Within the membrane unit 3 is shown a permeate side 4 with acid gases such as carbon dioxide and hydrogen sulfide being removed in line 5. A partially treated natural gas stream 7 is shown leaving a retentate side 6 of membrane unit 3. This partially treated natural gas stream 7 is mixed with the bypassing stream 2 to form stream 12. Stream 12 is sent to a column containing a solvent for further treating the natural gas to remove acid gases. Column 8 will normally contain an amine solvent that is known for removal of acid gases. Lean solvent 11 that contains a low amount of acid gases is shown entering column 8 in an upper portion of the column. Treated natural gas stream 10 is shown exiting the top of column 8 and a rich solvent stream 9 containing the acid gases that have been removed from stream 12 is shown exiting the bottom of column 8.

Figure 6:
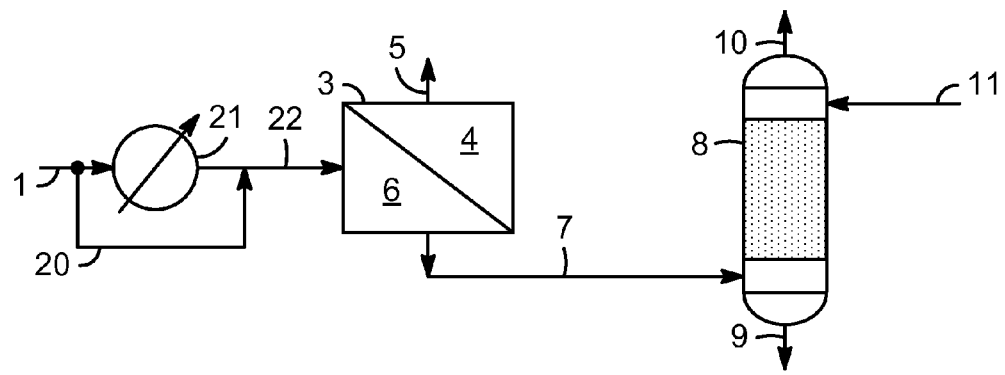
FIG. 6 is a membrane/amine column system for treating a natural gas stream in which there is a bypass stream around a preheater.

Another process configuration is shown in FIG. 6 where a bypass is designed for the membrane pre-heater. Based on the property of membrane, at higher temperature, the membrane will have higher flux with the same membrane area. In this configuration, when motion becomes stronger and severer, the pre-heater bypass will be reduced so that the membrane feed will have higher temperature. More acid gas will permeate through the membrane. Hence, the residue which is the feed to amine unit will have lower acid gas concentration.

More specifically in FIG. 6, is seen a natural gas stream 1 that is sent to a pre-heater 21 through line 22 to membrane unit 3. A portion 20 of natural gas stream 1 is shown bypassing pre-heater 21 and then being combined in line 22 with the natural gas stream that has been heated. Within membrane unit 3 is shown a permeate side 4 with acid gases such as carbon dioxide and hydrogen sulfide being removed in line 5. A partially treated natural gas stream 7 is shown leaving a retentate side 6 of membrane unit 3. This partially treated natural gas stream 7 is sent to a column containing a solvent for further treating the natural gas to remove acid gases. Column 8 will normally contain an amine solvent that is known for removal of acid gases. Lean solvent 11 that contains a low amount of acid gases is shown entering column 8 in an upper portion of the column. Treated natural gas stream 10 is shown exiting the top of column 8 and a rich solvent stream 9 containing the acid gases that have been removed from partially treated stream 7 is shown exiting the bottom of column 8.

Figure 7:
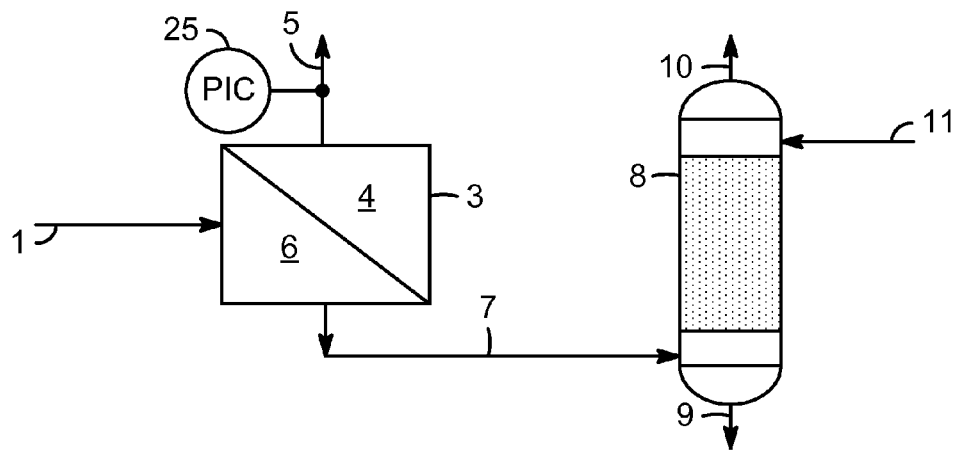
FIG. 7 is a membrane/amine column system for treating a natural gas stream in which there is a control system to adjust the pressures in the system.

FIG. 7 shows the third process configuration. In this configuration, the permeate pressure can be adjusted to control the acid gas removal from the membrane. The membrane process can run at higher permeate side pressure when there is no motion. The permeate side pressure can be reduced to increase the acid gas removal when required at severer motion of the ship or platform.

More specifically in FIG. 7 is seen a natural gas stream 1 that is sent to a membrane unit 3. Within the membrane unit 3 is shown a permeate side 4 with acid gases such as carbon dioxide and hydrogen sulfide being removed in line 5. A process control system 25 is shown measuring the pressure of the acid gas being removed that will control the pressure of the permeate side 4 of the membrane unit 3 depending upon the motion of the ship or platform. A partially treated natural gas stream 7 is shown leaving a retentate side 6 of membrane unit 3. This partially treated natural gas stream 7 is sent to a column containing a solvent, such as an amine solvent, for further treating the natural gas to remove acid gases. Lean solvent 11 that contains a low amount of acid gases is shown entering column 8 in an upper portion of the column. Treated natural gas stream 10 is shown exiting the top of column 8 and a rich solvent stream 9 containing the acid gases that have been removed from partially treated stream 7 is shown exiting the bottom of column 8.

Figure 8:
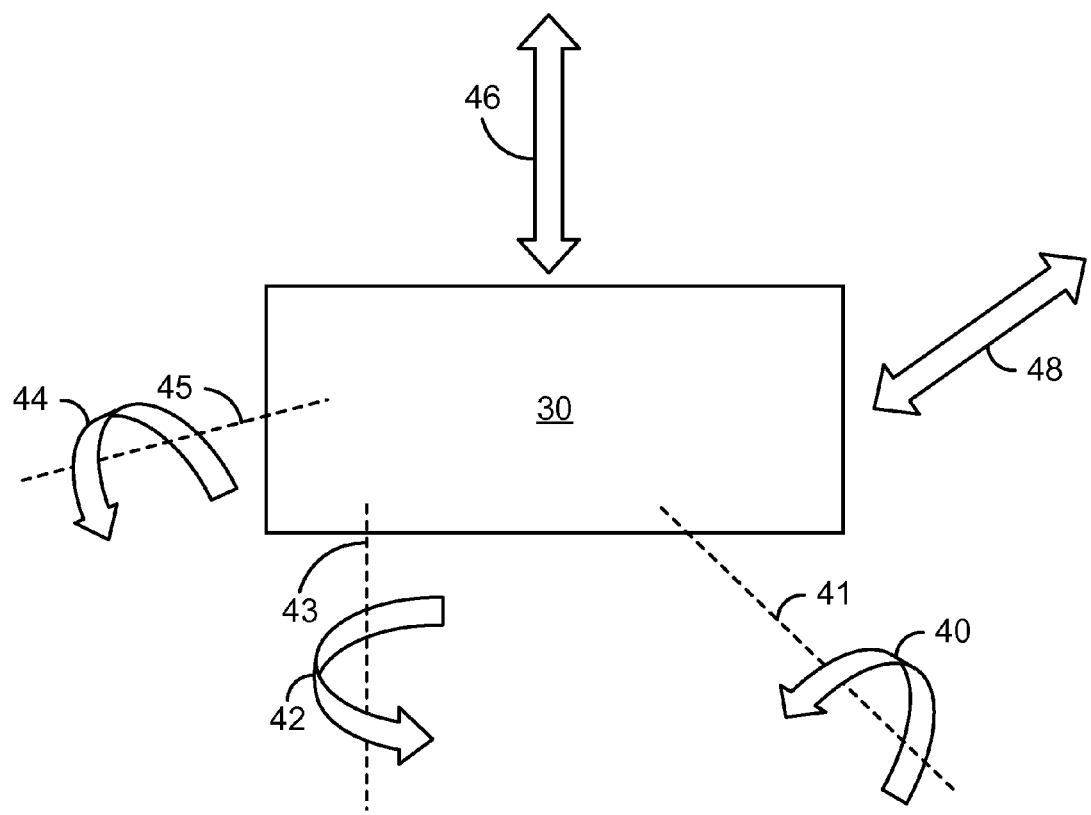
FIG. 8 is a diagram that shows the directions of motion that influence a platform on the ocean.

The advanced control system includes a motion detector which can detect the motion shown in FIG. 8. FIG. 8 shows a top surface of a platform for processing hydrocarbons. For the purposes of the present application, the equipment that would be mounted on the platform are not shown. What is of importance to an understanding of the present invention are the motions that the platform 30 may be subject to including roll 40 around axis 41, yaw 42 around axis 43, pitch 44 around axis 45, heave 46 and sway 48. The system includes an algorithm to calculate the maldistribution factor based on the motion detected, the control mechanism and program, and the control valves in process configurations such as those shown in FIGS. 5, 6, and 7. When the motion detector detects the motion, the control system will instantaneously send the feed back to the membrane system to either reduce the bypass flow in FIGS. 5 and 6, or reduce the permeate side pressure in FIG. 7, or do a combination of one or more bypass flows and reduction of permeate side pressure in some cases. In order to guarantee that the treated gas from amine unit always meet the acid gas specifications for the LNG liquefaction section, the amine column will be designed with some design margin. However, this design margin can be much less compared to a system that does not have a membrane unit to adjust the purity level of the natural gas stream going into the amine column.

The invention claimed is:

1. A process for removal of acid gases from an untreated natural gas stream comprising first sending said untreated natural gas stream to an ocean vessel and then sending said from 1 to 100% of said untreated natural gas stream through a membrane unit containing a membrane for selective separation of acid gases from natural gas and thereby forming a partially purified natural gas stream having an acid gas content lower than said untreated natural gas stream and then passing said partially purified natural gas stream and from 0 to 99% of said untreated natural gas stream to an amine column wherein said natural gas stream is placed in contact with an aqueous amine absorbent contained within the amine column, wherein said aqueous amine absorbent removes acid gases from said natural gas stream thereby forming a natural gas product effluent having an acid gas content less than said partially purified natural gas stream wherein as said ocean vessel is subjected to greater forces by wind and waves, less of said untreated natural gas stream passes directly to said amine column without first passing through said membrane unit.

2. The process of claim 1 wherein said membrane unit and said amine column are located on a ship, a barge or another vessel capable of passage on an ocean.

3. The process of claim 1 wherein said process is modified in accordance with a value $\lambda$ that is a measure of said column deviating from installation on a flat surface, wherein $$\lambda = \frac{L_{max} - L_{min}}{L_{max} + L_{min}}$$

and wherein L is a local liquid loading within said amine column and wherein said value $\lambda$ is compared to a predetermined value within a control unit that adjusts operation of said membrane unit to compensate for a decrease in efficiency of operation of said amine column in removing acid gases from said natural gas stream as said value $\lambda$ increases.

4. The process of claim 1 wherein said natural gas product effluent comprises less than 50 ppm carbon dioxide.

5. The process of claim 1 wherein a first portion of said untreated natural gas stream is sent in a bypass to go around said membrane unit while a second portion passes through said membrane unit followed by said first portion and said second portion being combined prior to passing through said amine column.

6. The process of claim 1 wherein at least a portion of said untreated natural gas stream is preheated before passing through said membrane unit.

7. The process of claim 6 wherein a second portion of said untreated natural gas stream passes to said membrane unit without being preheated.

8. The process of claim 5 wherein at least a portion of said untreated natural gas stream is preheated before passing through said membrane unit.

9. The membrane unit in the process of claim 5 wherein a pressure control system is used to adjust a permeate side pressure.

10. The membrane unit in the process of claim 7 wherein a pressure control system is used to adjust a permeate side pressure.

* * * * *